United States Patent [19]

Kashihara

[11] Patent Number: 4,843,922
[45] Date of Patent: Jul. 4, 1989

[54] HYDRAULIC CONTROL SYSTEM FOR AUTOMATIC TRANSMISSION
[75] Inventor: Yuji Kashihara, Toyota, Japan
[73] Assignee: Toyota Jidosha Kabushiki Kaisha, Aichi, Japan
[21] Appl. No.: 158,669
[22] Filed: Feb. 22, 1988
[30] Foreign Application Priority Data Feb. 27, 1987 [JP] Japan .................................. 62-44700

[51] Int. Cl.$^4$ ...................... B60K 41/18; B60K 41/16
[52] U.S. Cl. ......................................... 74/866; 74/867
[58] Field of Search ................................. 74/866, 867

[56] References Cited

U.S. PATENT DOCUMENTS

| 4,428,258 | 1/1984 | Kubo et al. | 74/867 |
| 4,445,401 | 5/1984 | Ishimaru | 74/867 X |
| 4,527,448 | 7/1985 | Person et al. | 74/869 |
| 4,653,350 | 3/1987 | Downs et al. | 74/866 X |
| 4,667,540 | 5/1987 | Yagi | 74/886 |
| 4,671,139 | 6/1987 | Downs et al. | 74/866 |
| 4,685,356 | 8/1987 | Iwatsuki | 74/866 |
| 4,690,017 | 9/1987 | Taniguchi et al. | 74/866 |
| 4,706,522 | 11/1987 | Nitz | 74/866 |
| 4,718,310 | 1/1988 | Shindo et al. | 74/867 |

FOREIGN PATENT DOCUMENTS 0149013  7/1985  European Pat. Off. .
2149464  6/1985  United Kingdom .

OTHER PUBLICATIONS

Patent Abstracts of Japan, unexamined applications, M section, vol. 10, No. 349, Nov. 26, 1986, (Application No. 61-149 656 & 61-149 657).
Patent Abstracts of Japan, unexamined applications, M section, vol. 10, No. 320, Oct. 30,1986, (Application No. 61-127 960).
Patent Abstracts of Japan, unexamined applications, M section, vol. 6, No. 20, Feb. 5, 1982, (Application No. 56-138 553).

Primary Examiner—Dirk Wright
Attorney, Agent, or Firm—Oliff & Berridge

[57] ABSTRACT

A hydraulic control system for an automatic transmission detects the rotating speed of the parts whose rotating speed varies due to shifting, and controls the transitional oil pressure applied to the frictionally engaging device in the automatic transmission so that the detected rotating speed matches the locus of the target rotating speed that said parts should follow after the shift command is outputted. Thus, the optimum shifting transitional characteristics can be obtained regardless of the inherent differences among otherwise identical vehicles which differences are created at the time of manufacturing or vary with time and vehicle use.

18 Claims, 10 Drawing Sheets

FIG.3

| SHIFT RANGE | GEAR | SOLENOID S1 | SOLENOID S2 | C0 | C1 | C2 | B0 | B1 | B2 | B3 |
|---|---|---|---|---|---|---|---|---|---|---|
| P | PARK | × | × | ○ | | | | | | |
| R | REV | × | × | ○ | | | | | | ○ |
| N | NEU | × | × | ○ | | | | | | |
| D | 1st | ○ | × | ○ | ○ | | | | | |
| D | 2nd | ○ | ○ | ○ | ○ | | | | ○ | |
| D | 3rd | × | ○ | ○ | ○ | ○ | | | ○ | |
| D | OD | × | × | | ○ | ○ | ○ | | ○ | |
| S | 1st | ○ | × | ○ | ○ | | | | | |
| S | 2nd | ○ | ○ | ○ | ○ | | | ○ | ○ | |
| S | (3rd) | × | ○ | ○ | ○ | ○ | | | ○ | |
| L | 1st | ○ | × | ○ | ○ | | | | | ○ |
| L | (2nd) | ○ | ○ | ○ | ○ | | | ○ | ○ | |

HYDRAULIC CONTROL SYSTEM FOR AUTOMATIC TRANSMISSION

BACKGROUND OF THE INVENTION

The present invention relates to a hydraulic control system for an automatic transmission, capable of reducing shocks in lifting the automatic transmission.

A hydraulically controlled automatic transmission is shifted by applying oil pressure to a frictionally engaging device to which oil pressure has not been applied or by releasing oil pressure from a frictionally engaging device to which oil pressure has been applied. Accordingly, the transitional characteristics of oil pressure in controlling frictionally engaging devices for shifting the automatic transmission, particularly those in which oil pressure is applied to the frictionally engaging devices, are very important for reducing shocks in shifting the automatic transmission.

Conventional hydraulic control systems for automatic transmissions have an accumulator in the form of a hydraulic cylinder including a piston for regulating the transitional characteristics of oil pressure to be applied in the frictionally engaging device. The accumulator is provided between a shift value for changing the oil supply passage to change the gear stage of the automatic transmission, and the frictionally engaging device. This accumulator maintains the supply oil pressure to be applied to the frictionally engaging device substantially at a set oil pressure for the period of time during which the piston slides within the cylinder to reduce shocks attributable to the variation of the input system in rotating speed in shifting the automatic transmission.

The optimum value of the set oil pressure is dependent on the torque of the engine transmitted to the automatic transmission. The set oil pressure can be controlled by regulating the oil pressure in the backpressure chamber of the accumulator.

Japense Patent Laid-Open (Kokai) No. 56-138553 discloses a hydraulic control system in which oil pressure, such as the line pressure or the throttle modulator pressure, which is varied according to the throttle opening (the degree of opening of the throttle valve of the engine: which represents engine torque) is applied to the backpressure chamber of such an accumulator to regulate the transitional oil pressure applied to the frictionally engaging device according to the torque of the engine by the accumulator.

Japanese Patent Laid-Open (Kokai) No. 61-149657 discloses a hydraulic control system for an automatic transmission, in which the oil pressure applied to the backpressure chamber of an accumulator is adjusted to a further optimum value on the basis of factors such as oil temperature in the automatic transmission, the temperature of the intake air, the type of shifting, the running speed of the vehicle, the engine speed and the supercharging pressure, in addition to the torque of the engine (the throttle opening), to regulate the oil pressure applied to the frictionally engaging device for optimum transitional characteristics. The hydraulic control system disclosed in Japanese Patent Laid-Open (Kokai) No. 61-149657 controls the transitional oil pressure acting on the frictionally engaging device on the basis of the present running condition of the vehicle or various parameters including those representing the ambient conditions of the vehicle, and hence the hydraulic control system is able to control the transitional characteristics of the oil pressure acting on the frictionally engaging device more minutely.

However, the following problems arise in this hydraulic control system when mounted on a vehicle for practical control operation.

Namely, although many parameters representing the running condition of the vehicle and the ambient conditions of the vehicle are employed for controlling the transitional characteristics of the oil pressure, the hydraulic control system inevitably includes causes of indefinite variation which cannot be expected at the stage of design and the causes can develop significantly. For example, the line pressure, namely, the basic pressure, of a hydraulic control system is regulated, in general, on the basis of data obained through a throttle cable interlocked with the throttle valve of the engine, and a throttle cam. In such an arrangement, the adjustment of the throttle cable is different between vehicles and such difference cannot be taken into consideration in producing a control program to be executed by the computer. Moreover, it is difficult to design the hydraulic control system so as to be able to accomodate variations in the mode of flow of oil in the oil pressure due to the accumulation of impurities in the oil. Naturally, these inherent variations which occur in the manufacturing process or develop with time cause the faulty regulation of the transitional characteristics of the oil pressure applied to the frictionally engaging device, thereby deteriorating the shift characteristics of the automatic transmission.

SUMMARY OF THE INVENTION

Accordingly, it is an object of the present invention to provide a hydraulic control system for an automatic transmission, capable of properly dealing with the inherent differences among otherwise identical vehicles, which differences are created during the manufacturing process or vary with time and vehicle use, to enable the automatic transmission to always operate with optimum shift characteristics.

To achieve the object of the invention, the present invention provides a hydraulic control system comprising, as shown in FIG. 1, means for detecting the rotating speed of the parts whose rotating speed is varied upon shifting of the automatic transmission; means for determining the locus along which the target rotating speed that said parts should follow after a shift command; and means for controlling the transitional oil pressure applied to the frictionally engaging device in the automatic transmission in order to change the rotating speed of said parts in accordance with the locus of said target rotating speed.

This invention detects the rotating speed of the parts whose rotating speed is varied upon shifting (such as the turbine shaft, various clutch drums or brake drums, or the engine output shaft), and controls the transitional oil pressure applied to the frictionally engaging device so that the rotating speed of the parts can be adjusted in accordance with the locus of said target rotating speed. Consequently, the transitional oil pressure applied to the frictionally engaging device is always varied in accordance with the locus along which the target rotating speed follows with the passage of time, regardless of the inherent differences, among otherwise identical vehicles, which are created during manufacturing or vary with time and vehicle use. Therefore, this invention always obtains optimum transitional shifting state.

The locus of the target rotating speed can be determined, for example, for each shifting operation in accordance with the torque inputted into the automatic transmission (the engine output torque) at that time. Pattern selecting state may be taken into consideration to determine the locus of the target rotating speed. When power pattern is selected, the locus of the target rotating speed as a whole should be rather high than that when normal or economy pattern is selected.

The method of controlling the transitional oil pressure applied to the hydraulic engaging device may be achieved, for example, by means for controlling line pressure, or means for directly controlling oil pressure just before it is supplied to the frictionally engaging device. With this invention, however, it is desirable that the hydraulic pressure control is achieved by controlling the accumulator backpressure. By using the accumulator, not only can the transitional oil pressure applied to the frictionally engaging device be controlled with great precision, but also the necessary line pressure can be supplied to the frictionally engaging device, even if a failure occurs in the hydraulic control system, so that the inherent shift control operation can be carried out.

Furthermore, when the transitional oil pressure supplied to the frictionally engaging device is controlled, it is desirable that signals for correcting the transitional oil pressure are changed according to any differences between the target rotating speed and the actual rotating speed. As a result, when the actual rotating speed differs considerably from the target rotating speed at that moment, a large correction will be performed, and when it differs slightly, then only a minor correction will be performed. Therefore, excellent responsiveness and precise control can be both obtained.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein:

FIG. 3 is a table showing the operating modes of frictionally engaging devices of the automatic transmission of FIG. 2;

DESCRIPTION OF THE PREFERRED EMBODIMENTS

The present invention will be described in detail hereinafter with reference to the accompanying drawings illustrating the preferred embodiment of the present invention.

In this embodiment, accumulator backpressure is controlled in order to control the transitional oil pressure applied to the frictionally engaging device. This control is performed by controlling the duty ratio of a solenoid valve according to the difference between the actual rotating speed of the clutch drum and its target rotating speed. In this case, the accumulator backpressure is controlled not only by controlling duty ratio of the solenoid valve. Namely, the accumulator backpressure is adjusted mechanically according to the throttle opening, and this adjusted pressure is corrected through control of the duty ratio of the solenoid valve.

Figure 1:
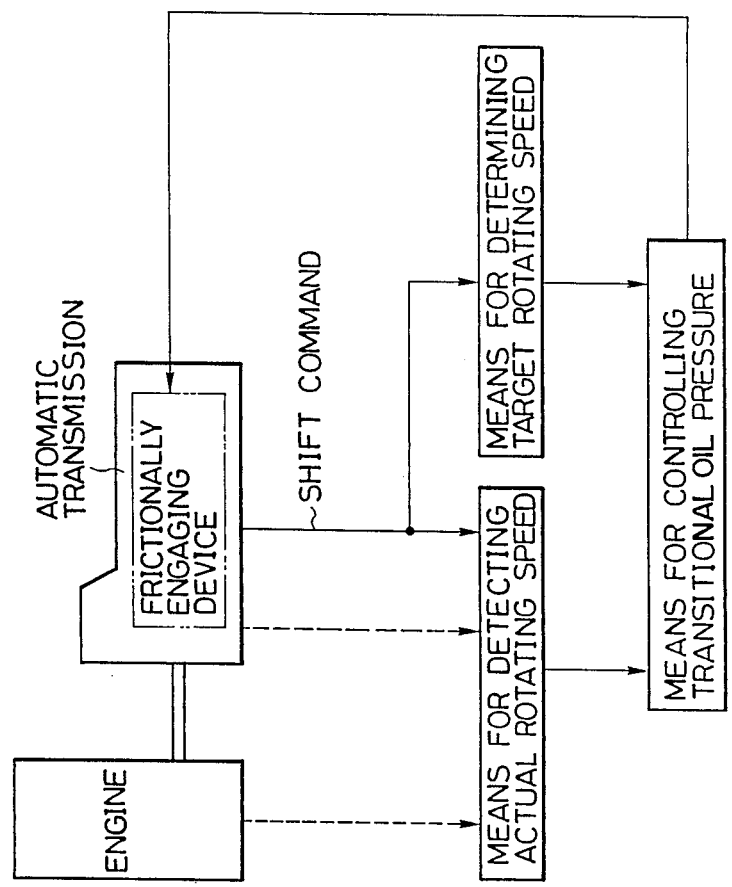
FIG. 1 is a block diagram of the present invention.
Figure 2:
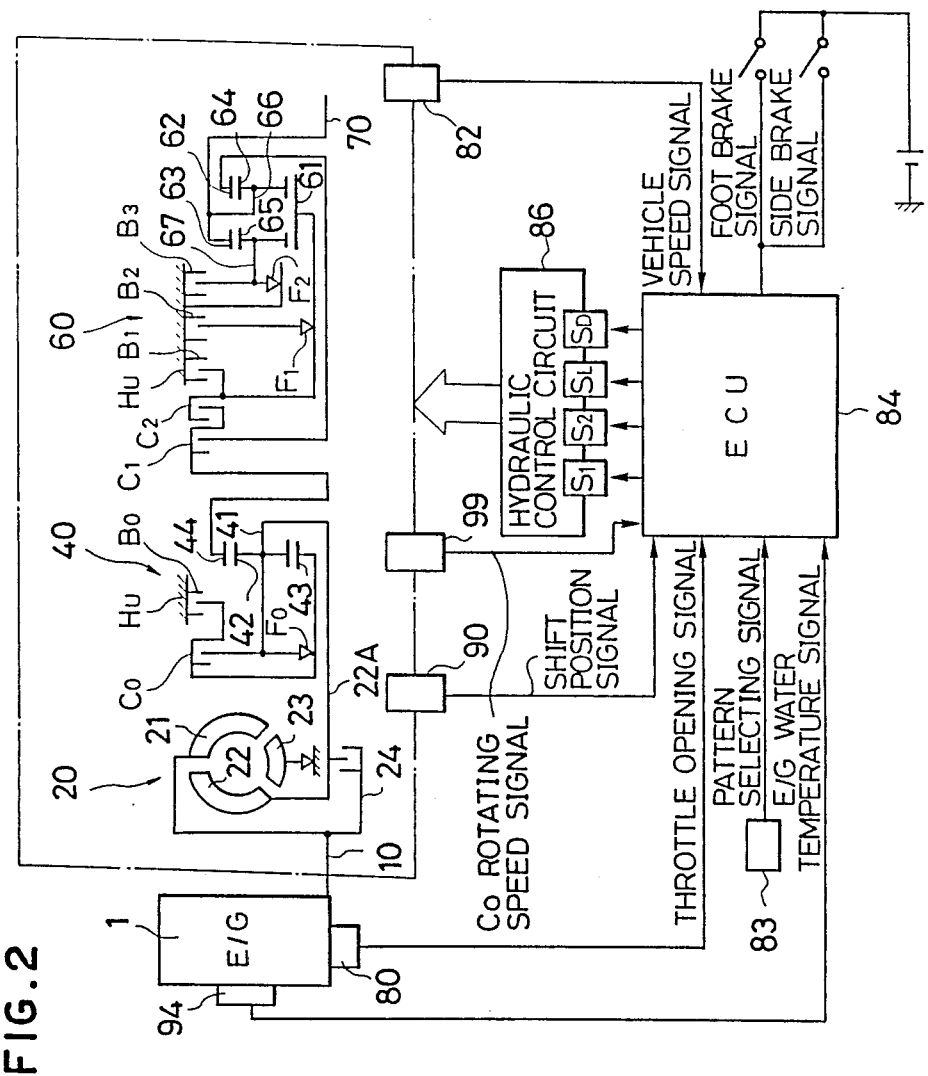
FIG. 2 is a block diagram of an automative automatic transmission incorporating a hydraulic control system, in a preferred embodiment, according to the present invention.

Referring to FIG. 2, an automotive automatic transmission incorporating a hydraulic control system, in a preferred embodiment, according to the present invention has a transmission unit comprising a torque converter 20, an overdrive unit 40 and an underdrive unit 60 having three forward gear stages and one reverse gear stage.

The torque converter 20 is of a known type comprising a pump 21, a turbine 22, a stator 23 and a lockup clutch 24.

The overdrive unit 40 has a planetary gearing comprising a sun gear 43, a ring gear 44, a planetary pinion 42 and a carrier 41. The operating mode of the planetary gearing is controlled through the control of a clutch C0, a brake B0 and a one-way clutch F0.

The underdrive unit 60 has two sets of planetary gearings comprising a common sun gear 61, ring gears 62 and 63, planetary pinions 64 and 65 and carriers 66 and 67. The respective operating modes of the two sets of planetary gearings and the connection of the same with the overdrive unit 40 are controlled through the control of clutches C1 and C2, brakes B1, B2 and B3 and one-way clutches F1 and F2. The transmission unit per se is of a known type and hence the construction thereof will be illustrated diagrammatically in FIG. 2 and the description thereof will be omitted.

The automatic transmission comprises the foregoing transmission unit and an electronic control unit (ECU) 84. Signals provided by a throttle detector 80 for detecting the throttle opening of the engine 1, representing output torque of an engine 1 to determine shift point, a running speed detector 82 for detecting the running speed of the vehicle through the detection of the output shaft 70 of the transmission unit, pattern selecting state detector 83 for detecting the pattern selecting state which is selectable by the driver, and an input shaft speed detector 99 for detecting the rotating speed of the input shaft of the automatic transmission, namely, the rotating speed of the turbine 22, to produce a signal representing a transitional shifting state, are applied to the ECU 84. The ECU 84 controls, on the basis of the signals applied thereto by the detectors, the solenoid valves S1 and S2 for controlling a shift valve, and solenoid SL for controlling a lockup clutch 24 of the torque converter 20, according to a predetermined map defining the relationship between throttle opening and running speed, to select an appropriate combination of the respective operating states of the clutches and brakes among those shown in FIG. 3.

Figure 4:
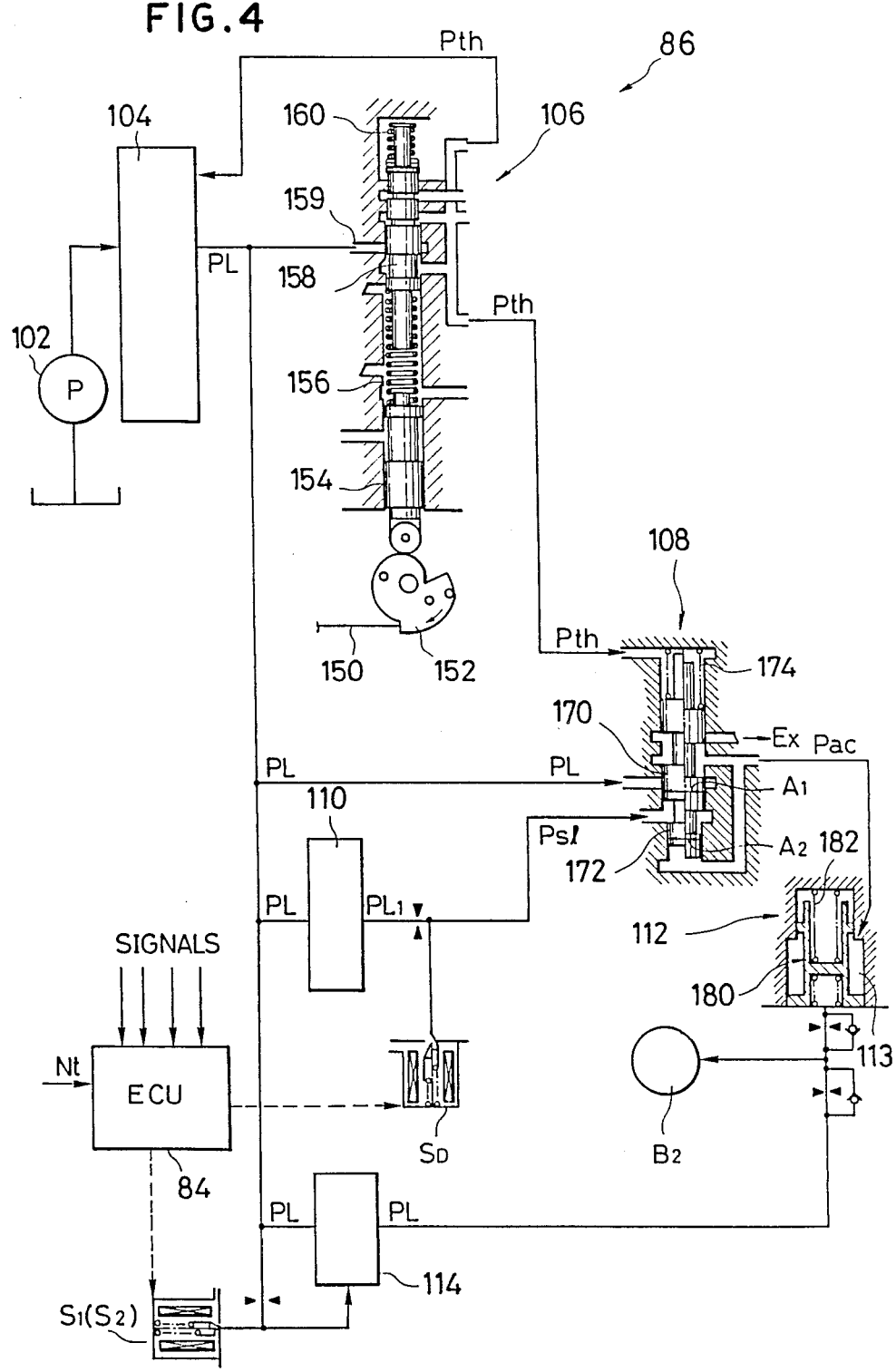
FIG. 4 is a hydraulic circuit diagram showing a portion of the hydraulic control system incorporated into the automatic transmission of FIG. 2.

Referring to FIG. 4 showing part of the hydraulic control circuit 86, there are shown an oil pump 102, a primary regulating valve 104, a throttle pressure valve 106, an accumulator backpressure control valve 108, a modulator valve 110, an accumulator 112 and a shift valve 114. In FIG. 4, only the brake B2 is shown as an exemplification of the frictionally engaging devices.

Pressure generated by the oil pump 102 is regulated to a line pressure PL by a known method by the primary regulating valve 104.

Figure 5:
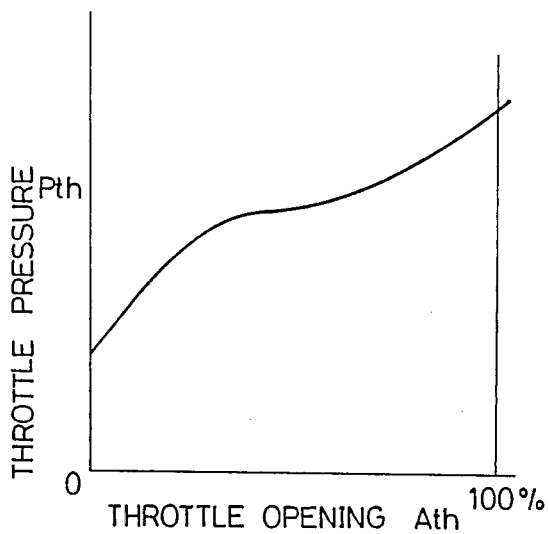
FIG. 5 is a graph showing the relationship between the throttle opening of the engine and throttle pressure.

The throttle valve 106 provides a throttle pressure corresponding to the position of the accelerator pedal, namely, a pressure representing the output torque of the engine. The throttle opening of the throttle valve (not shown) of the engine is transmitted mechanically to the throttle pressure valve 106 through a throttle cable 150 and a throttle cam 152. When the accelerator pedal is depressed, the throttle cam 152 is turned by the throttle cable 150 to push a downshift plug 154 upward, and the downshift plug 154 pushes a spool 158 upward through a spring 156. Consequently, a line pressure port 159 is opened to generate a throttle pressure Pth. Namely, the throttle pressure Pth is also delivered (fed-back) to the opposite side of the spool 158. According to the balance among resilient force of the spring 156, resilient force of a spring 160, and pressure force of the throttle pressure Pth, the line pressure port 159 is closed. Thus, the throttle pressure Pth represents the throttle opening of the engine 1. FIG. 5 shows the above relationship of the throttle pressure Pth and throttle opening Ath. The throttle pressure Pth is applied also to the primary regulating valve 104, and hence the line pressure PL regulated by the primary regulating valve 104 represents the output torque of the engine.

Figure 6:
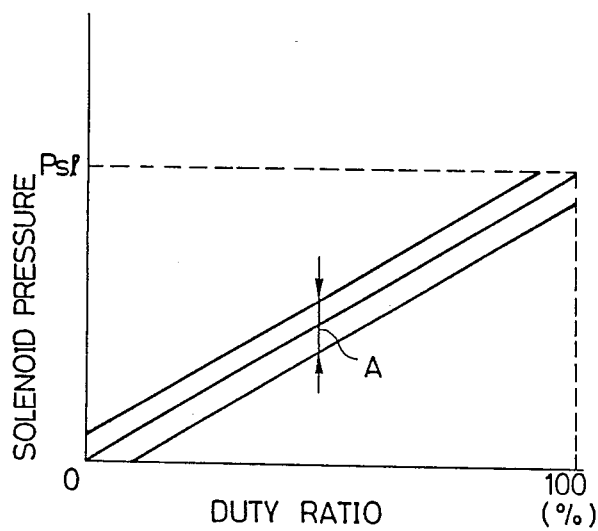
FIG. 6 is a graph showing the relationship between duty ratio and solenoid pressure.

On the other hand, in order to change the rotating speed of the drum following the locus of the target rotation speed, the pressure representing the transitional shift state to correct the throttle pressure Pth is generated as follows. As mentioned above, the drum rotating speed nc0 of the clutch C0 is applied to the ECU 84. The rotating speed nc0 of the drum C0 is compared with a predetermined reference rotating speed Nc0. For example, when the automatic transmission is upshifted, the C0 drum rotating speed nc0 is reduced. When the rotating speed nc0 is reduced faster than the reference rotating speed Nc0, the progress of the upshifting operation is excessively fast. In such a case, a pressure representing transitional shift state is generated so as to reduce the transitional oil pressure applied to the frictionally engaging devices. Specifically, the duty ratio of a solenoid valve SD is controlled by the ECU 84 to generate the transitional oil pressure. Namely, the transitional oil pressure is generated by regulating an oil pressure PL1, which is already generated by modulating the line pressure PL by the modulator valve 110, to a solenoid pressure Psl corresponding to the duty ratio. FIG. 6 shows the relationship between duty ratio and solenoid pressure (pressure representing transitional shift state) Psl.

Figure 7:
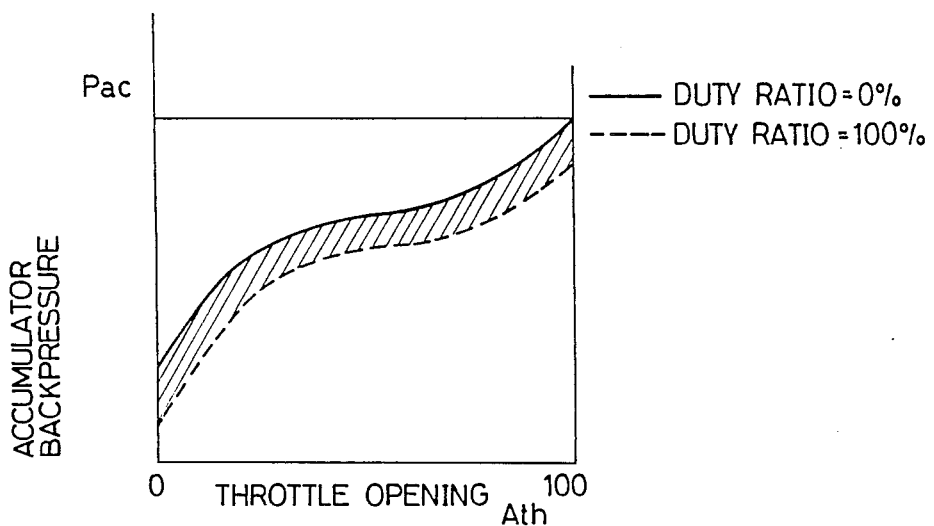
FIG. 7 is a graph showing the relationship between the throttle opening of the engine and the backpressure of an accumulator.

The accumulator backpressure control valve 108 receives the throttle pressure Pth representative of the engine torque and the solenoid pressure Psl representative of transitional shift state, and regulates the line pressure PL to an accumualator backpressure Pac according to the pressures Pth and Psl. Pressure balance in the accumulator backpressure control valve 108 is expressed by $$Pac = A1/A2 \cdot Pth + Fs/A2 - Psl(A1/A2 - 1) \quad (1)$$

where A1 is the pressure receiving area of a land 170, A2 is the pressure receiving area of a land 172, Fs is the resilient force of a spring 174, and, as obvious from FIG. 4, A1>A2. As obvious from the expression (1), basically, the accumulator backpressure Pac is dependent on the throttle pressure Pth and is corrected by a value corresponding to Psl(A1/A2−1). FIG. 7 shows the relationship between the accumulator backpressure Pac and the throttle opening Ath. It is known from FIG. 7 that the accumulator backpressure Pac rises with increasing throttle opening, and that the accumulator backpressure Pac is corrected on the basis of the solenoid pressure Psl, i.e., the duty ratio determined by the ECU 84. If, for any reason, the solenoid valve SD malfunctions, the variation of the accumulator backpressure Pac is limited within a narrow range. Since the solenoid valve SD corrects and regulates the accumulator backpressure Pac minutely, the accuracy of the control of the accumulator backpressure Pac is not affected significantly by incorrect operation of the solenoid valve SD. Accordingly, the automatic transmission can be controlled accurately without using an especially expensive solenoid valve.

Figure 8:
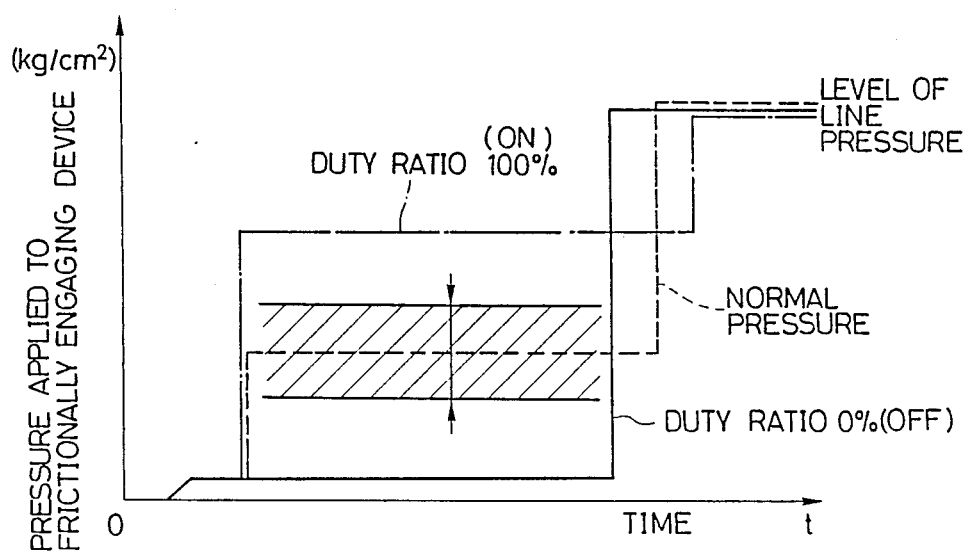
FIG. 8 is a diagram showing the state of variation of the transitional oil pressure applied to the frictionally engaging devices due to the dispersion of the operation of a solenoid valve.

As shown in FIG. 6, there is a range A in the output pressure Psl of the solenoid valve SD for a specific duty ratio. Accordingly, if the accumulator backpressure Pac is determined by a single solenoid valve system, the actual accumulator backpressure may vary corresponding to a normal accumulator backpressure over a wide range indicated by the shaded area in FIG. 8. However, in the present embodiment, since the basic characteristics of accumulator backpressure Pac are determined by the throttle pressure and the basic characteristics are corrected according to the actual transitional shift state, the influence of the incorrect operation of the solenoid valve SD on the working pressure is insignificant, and hence the working oil pressure can be controlled more correctly.

Referring again to FIG. 4, when the computer 84 decides to start shifting operation from 1st to 2nd and the shift valve 114 is controlled by the solenoid valve S1, the line pressure Pl is applied to the brake B2 and the accumulator 112, and then the piston 180 of the accumulator 112 starts moving up. While the piston 180 is moving up, the pressure applied to the brake B2 (transitional oil pressure) is maintained at a pressure corresponding to the downward composite forces of the spring 182 and the pressure generated by the accumulator backpressure Pac applied to the backpressure chamber 113 of the accumulator 112. Accordingly, the transitional oil pressure applied to the brake B2 can be controlled as shown in FIG. 9 by controlling the accumulator backpressure Pac by the foregoing procedure.

Figure 9:
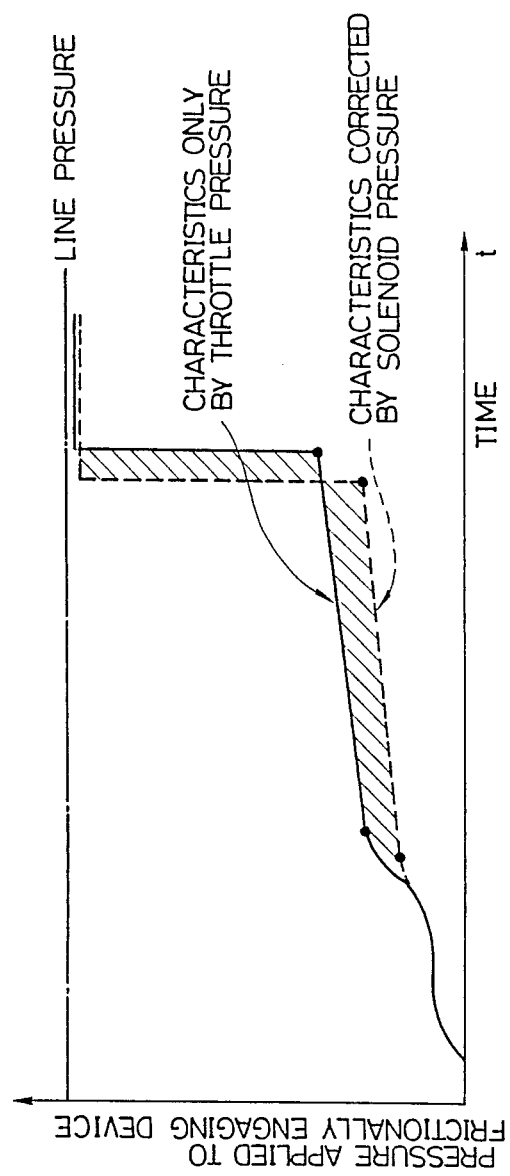
FIG. 9 is a diagram showing the state of increase of the transitional oil pressure.

In FIG. 9, continuous lines indicate the characteristics of the transitional oil pressure controlled only on the basis of the throttle pressure Pth, and broken lines indicate the corrected characteristics of the pressure corrected by using the solenoid pressure Psl. In FIG. 9, the shaded areas represent a correction made by the solenoid pressure Psl indicating the transitional shift state.

Figure 10:
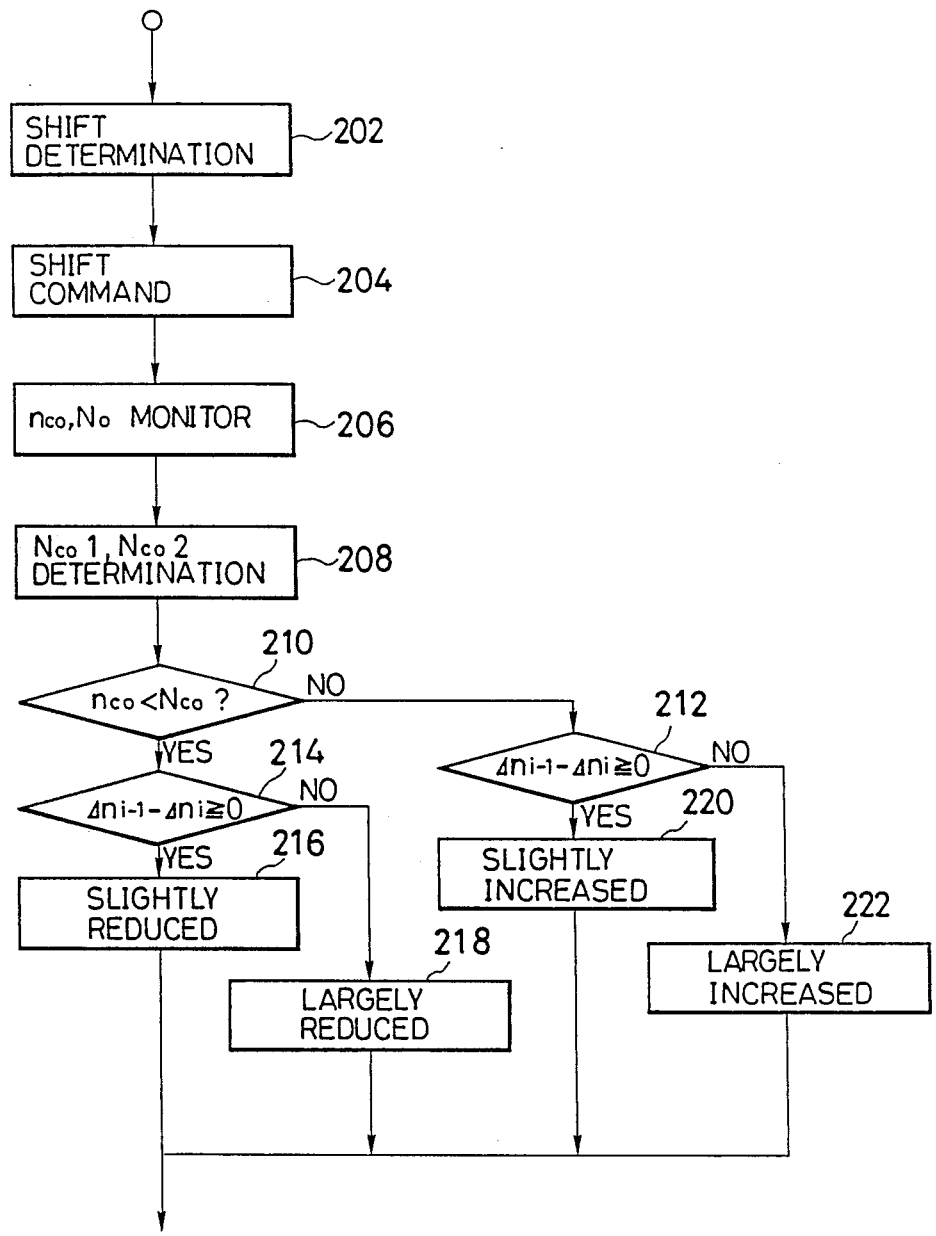
FIG. 10 is a flow chart showing the control flow of controlling the increase and decrease in the transitional oil pressure applied to the frictionally engaging device.

FIG. 10 shows the control flow when the transitional oil pressure is to be increased or decreased by utilizing the invention.

Shifting is determined in Step 202 according to the vehicle speed and throttle opening in accordance with conventional skill. As a result, the specific shift command is outputted in step 204. At the same time, C0 drum rotating speed nc0 and the output shaft rotating speed n0 of the automatic transmission are monitored in Step 206. The initial value Nco1 and the ending value Nco2, which respectively correspond to the C0 drum rotating speed nc0 at the time of beginning and ending of the shifting, are determined by the following equations (2) and (3) in Step 208.

$$Nco1 = n0 \times iL - \alpha \quad (2)$$

$$Nco2 = n0 \times iH - \beta \quad (3)$$

where iL is the gear ratio of the lower gear stage, iH is the gear ratio of the higher gear stage, and $\alpha$ and $\beta$ are constant values.

Figure 11:
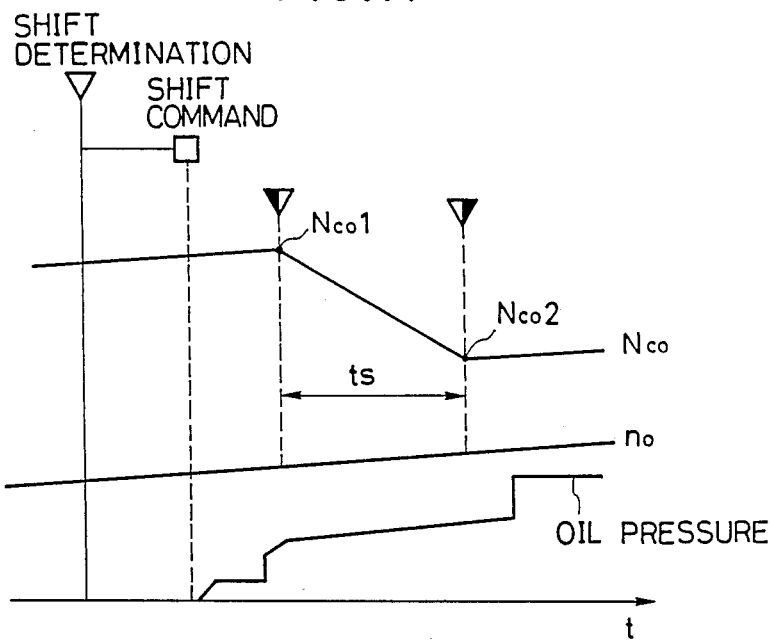
FIG. 11 is a diagram showing transitional characteristics of the locus of the target rotating speed.
Figure 12:
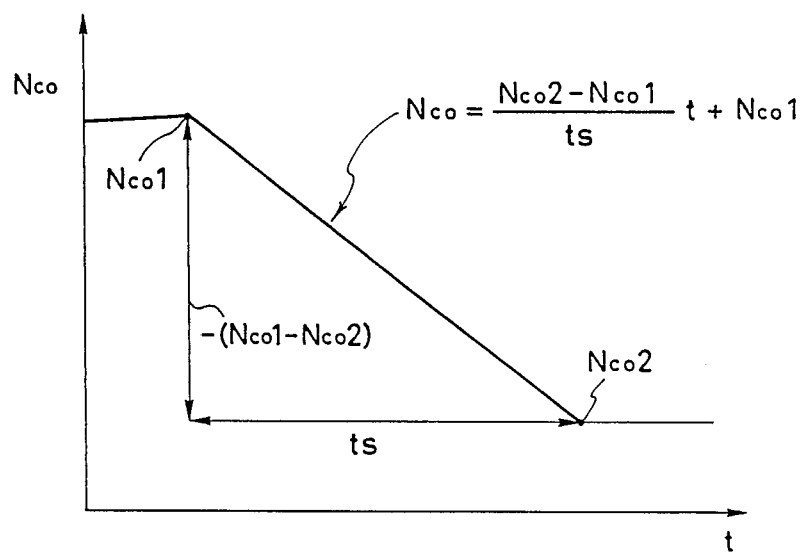
FIG. 12 is a diagram extracting a part of the target rotating speed which is varied.

Solenoid pressure Psl is controlled so as to direct actual C0 drum rotating speed nc0 from the initial value Nco1 toward the ending value Nco2 over the predetermined time period ts as shown in FIG. 11. The target rotating speed Nc0 of C0 drum at the time of beginning and ending of the shifting can be obtained by the following equation (4) as clearly shown in FIG. 12.

$$Nc0 = (Nco2 - Nco1)/ts \cdot t + Nco1 \quad (4)$$

In Steps 210-214, the following determinations are each performed: $nc0 < Nc0$, $\Delta n_{i-1} - \Delta ni \geq 0$, $\Delta n_{i-1} - \Delta ni > 0$. According to the results, control for slightly reducing pressure, for reducing pressure, for slightly increasing pressure and for increasing pressure of the transitional oil pressure applied to the frictionally engaging device are each performed in Steps 216-222. $\Delta ni$ is $|Nc0 - nc0|$, the absolute value of the difference between the target value and actual measured value at the present detecting timing. $\Delta n_{i-1}$ is the absolute value of the difference between the target value and the actual measured value at the preceding detecting timing.

In steps 214-222, one of the 4 situations can be selected. The purpose is as follows.

Figure 13A:
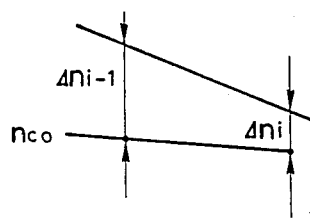
FIGS. 13(A) through 13(D) are diagrams showing relationships between the target rotating speed and the actual rotational speed.
Figure 13B:
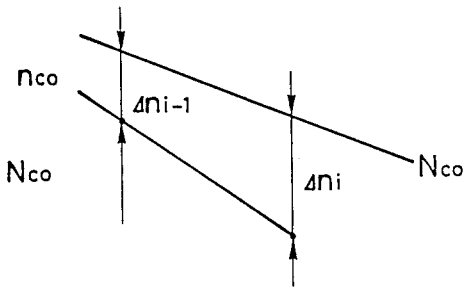
Figure 13C:
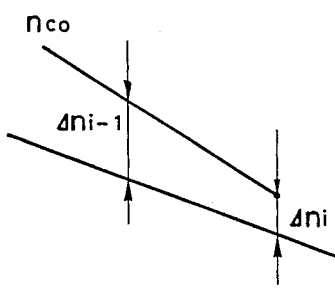

When the actual rotating speed nco is less than the target rotating speed Nco, the shifting speed is rather quick, and the transitional oil pressure applied by the frictionally engaging device is controlled in the direction of decrease. In this case, when $\Delta n_{i-1} - \Delta ni \geq 0$, as shown in FIG. 13(A), since the actual rotating speed nco approaches the target rotating speed Nc0, the oil pressure is controlled to be slightly reduced. However, when $\Delta n_{i-1} - \Delta ni < 0$, as shown in FIG. 13(B), since the actual rotating speed nc0 tends to be departing farther from the target rotating speed Nc0, i.e., the shifting speed is extremely fast, the oil pressure is controlled to be relatively largely reduced.

Figure 13D:
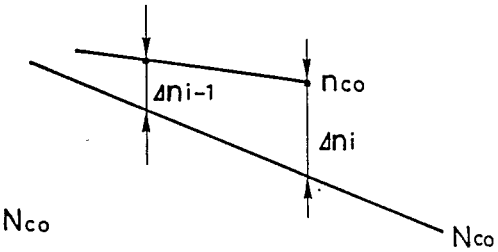

On the other hand, when the actual rotating speed nc0 is greater than the target rotating speed Nc0, since the shifting speed is less than the standard speed, the oil pressure is controlled to be increased. However, when $\Delta n_{i-1} - \Delta ni < 0$, as shown in the FIG. 13(D), since the actual rotating speed nc0 tends to be departing farther from the target rotating speed Nco, i.e., shifting speed is extremely slow, the oil pressure is controlled to be relatively largely increased.

Specifically, the solenoid pressure Psl is increased or decreased, then this increased or decreased pressure Psl influences the decrease or increase in the accumulator backpressure Pac, and, as a result, the transitional oil pressure applied to the frictionally engaging device is increased or decrease. Since the increase and decreace in the solenoid pressure Psl is controlled to make the actual rotating speed of C0 drum be the target rotating speed, the optimum shift characteristics of the transmission can be always obtained under any conditions.

Furthermore, the specific automatic transmission applicable to the specific type of engine can be easily adapted to other types of engines, by just changing the shifting time (said predetermined time ts). This invention drastically improves the adaptability of the automatic transmission system to different engines.

What is claimed is:

1. A hydraulic control system for an automatic transmission which includes a frictionally engaging device, comprising:
    means for detecting the rotating speed of at least one part whose rotating speed is varied during transmission shifting;
    means for determining the locus of the target rotating speed that said part must follow after a command of said shifting:
    means for detecting the difference between said target rotating speed and the actual rotating speed;
    means for detecting a varying state of said difference between the target rotating speed and the actual rotating speed; and
    means for controlling a transitional oil pressure applied to the frictionally engaging device in accordance with the varying state of said difference so that the rotating speed of said part varies in accordance with said target rotating speed.

2. A hydraulic control system as set forth in claim 1, further comprising:
    means for detecting different types of transmission shiftings, and said locus of said target rotating speed is determiined for each of said shifting types.

3. A hydraulic control system as set forth in claim 1, further comprising:
    means for detecting pattern selecting state of said automatic transmission, and said locus of said target rotating speed is determined for each of said pattern selecting states.

4. A hydraulic control system as set forth in claim 1, further comprising:
    means for detecting torque being inputted to said automatic transmission, and said locus of said target rotating speed is determined in response to said torque being inputted.

5. A hydraulic control system as set forth in claim 1, further comprising:
    means for detecting different types of transmission shiftings;
    means for detecting pattern selecting state of said automatic transmission; and
    said locus of said target rotating speed is determined for each of said shifting types and said pattern selecting states.

6. A hydraulic control system as set forth in claim 1, further comprising:
  means for detecting different types of transmission shiftings;
  means for detecting torque being inputted to said automatic transmission; and
  said locus of said target rotating speed is determined for each of said shifting types in response to said torque being inputted.

7. A hydraulic control system as set forth in claim 1, further comprising:
  means for detecting pattern selecting state of said automatic transmission shiftings;
  means for detecting torque being inputted to said automatic transmission; and
  said locus of said target rotating speed is determined for each of said pattern selecting states in response to said torque being inputted.

8. A hydraulic control system as set forth in claim 1, further comprising:
  means for detecting different types of transmission shiftings;
  means for detecting pattern selecting state of said automatic transmission,
  means for detecting torque being inputted to said automatic transmission; and
  said locus of said target rotating speed is determined for each of said shifting types and pattern selecting states in response to said torque being inputted.

9. A hydraulic control system as set forth in claim 4, further comprising:
  means for detecting throttle opening, and said torque being inputted to said automatic transmission is determined according to the throttle opening.

10. A hydraulic control system as set forth in claim 6, further comprising:
  means for detecting throttle opening, and said torque being inputted to said automatic transmission is determined according to the throttle opening.

11. A hydraulic control system as set forth in claim 7, further comprising:
  means for detecting throttle opening, and said torque being inputted to said automatic transmission is determined according to the throttle opening.

12. A hydraulic control system as set forth in claim 8, further comprising:
  means for detecting throttle opening, and said torque being inputted to said automatic transmission is determined according to the throttle opening.

13. A hydraulic control system as set forth in claim 1, wherein said detecting means for detecting varying state of the difference between the target rotating speed and actual rotating speed detects whether or not the difference between the target rotating speed and actual rotating speed at the present detecting timing is greater than the difference at the preceding detecting timing.

14. A hydraulic control system as set forth in claim 1, further comprising:
  an accumulator with a backpressure chamber in an oil passage of said hydraulic control system;
  an accumulator backpressure control valve for controlling oil pressure applied to said backpressure chamber; and
  the means for controlling said transitional oil pressure includes the combined means of said accumulator and said accumulator backpressure control valve for controlling said transitional oil pressure.

15. A hydraulic control system as set forth in claim 1, wherein:
  the means for controlling said transitional oil pressure adjusts the oil pressure mechanically, and
  corrects electrically said oil pressure adjusted mechanically so that the actual rotating speed varies according to the locus of the target rotating speed.

16. A hydraulic control system as set forth in claim 16, wherein:
  the means for controlling said transitional oil pressure basically adjusts the oil pressure mechanically, and
  corrects electrically said oil pressure adjusted mechanically so that the actual rotating speed varies according to the locus of the target rotating speed.

17. A hydraulic control system as set forth in claim 17, further comprising:
  a throttle pressure valve for controlling the transitional oil pressure mechanically in accordance with a throttle opening, and
  said means for controlling the transitional oil pressure further includes said throttle pressure valve.

18. A hydraulic control system as set forth in claim 18, further comprising:
  a throttle pressure valve for controlling the transitional oil pressure mechanically in accordance with a throttle opening, and
  said means for controlling the transitional oil pressure further includes said throttle pressure valve.

* * * * *